April 9, 1940.  B. COOPER  2,196,194

KEY OPERATED IDENTIFIER

Filed May 7, 1936  4 Sheets-Sheet 1

INVENTOR.
Benjamin Cooper
BY
Judah B. Felshin
ATTORNEY.

April 9, 1940. B. COOPER 2,196,194
KEY OPERATED IDENTIFIER
Filed May 7, 1936 4 Sheets-Sheet 2

INVENTOR
Benjamin Cooper
BY
Judah B. Felshin
ATTORNEY April 9, 1940.   B. COOPER   2,196,194
KEY OPERATED IDENTIFIER
Filed May 7, 1936   4 Sheets-Sheet 3

INVENTOR
Benjamin Cooper
BY
Judah B. Felshin
ATTORNEY

April 9, 1940.  B. COOPER  2,196,194
KEY OPERATED IDENTIFIER
Filed May 7, 1936  4 Sheets-Sheet 4

INVENTOR
Benjamin Cooper
BY
Judah B. Felshin
ATTORNEY

Patented Apr. 9, 1940

2,196,194

UNITED STATES PATENT OFFICE 2,196,194

KEY OPERATED IDENTIFIER

Benjamin Cooper, New York, N. Y.

Application May 7, 1936, Serial No. 78,333

15 Claims. (Cl. 234—27.5)

This invention relates to key operated identifier.

An object of this invention is to provide an identification unit for use in registers, watchman systems, and the like purposes and having a pulser actuated by a key to actuate printing counters, whereby a number may be printed corresponding to the shape of the key.

A further object of this invention is to provide in a unit of the character described, means for preventing turning of the key or causing pulsation until the key is completely inserted within the unit.

A still further object of this invention is to provide in an identifying unit of the character described means for automatically resetting the number indicator or counter to zero when the identification key is withdrawn from the unit.

Yet another object of this invention is to provide in a unit of the character described means to indicate that a key is inserted into the unit and that a number appears on the number indicator.

Yet another object of this invention is to provide a unit of the character described so constructed that once the key inserted therein has been turned, it cannot be turned back until the pulser is returned to its original position, whereby the key cannot be removed from the identifying unit until the pulser has returned to its original or zero position.

It is still another object of this invention to provide in a unit of the character described means for printing numbers indicated on the counter wheels when the key has been inserted into the unit and for visually indicating the number on the counter wheels.

A still further object of this invention is to provide a compact and rugged unit of the character described which shall be easy to operate, relatively inexpensive to manufacture, positive in action, which shall have a large variety of applications, and yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Fig. 16 is a cross-sectional view taken on line 16—16 of Fig. 6;

Referring now in detail to the drawings, and particularly to Figs. 1 to 20, 10 designates an identifying unit embodying the invention and 11 designates a key used therewith. The key 11 (Fig. 17) is in the form of a flat elongated bar having a central longitudinal groove 12 on one face thereof and a pair of aligned notches 13 in the side edges thereof adjacent the rear. One or both of the side edges may be cut away as at 14 for any desired length. The length of the cut-away portions determines the number of pulsations and the digits which will be printed, as will appear hereinafter. The key is adapted to actuate two pulsers either the same or a different number of times for actuating two printing counters and printing two digits. If one side edge is not cut away, there will be such pulsation on one of the pulsers that one of the digits printed will be zero. The key furthermore has a cammed or ramped under edge 16 at the front end thereof and adjacent one cut-away edge 14 for the purpose hereinafter appearing.

The identifier 10 may comprise any suitable frame or casing having a front wall 17 (Fig. 11) and side walls 18 and 19. The side walls 18 and 19 are interconnected by an elongated screw 20 fixed thereto by a screw 20a or in any other suitable manner. The screw 20 supports a central wall 22 parallel to the walls 18 and 19 and substantially midway therebetween. Sleeves 20b in said screw serve as spacers for said central wall.

Figures 11, 12, 13, 14, 15, 17, 18, 19:
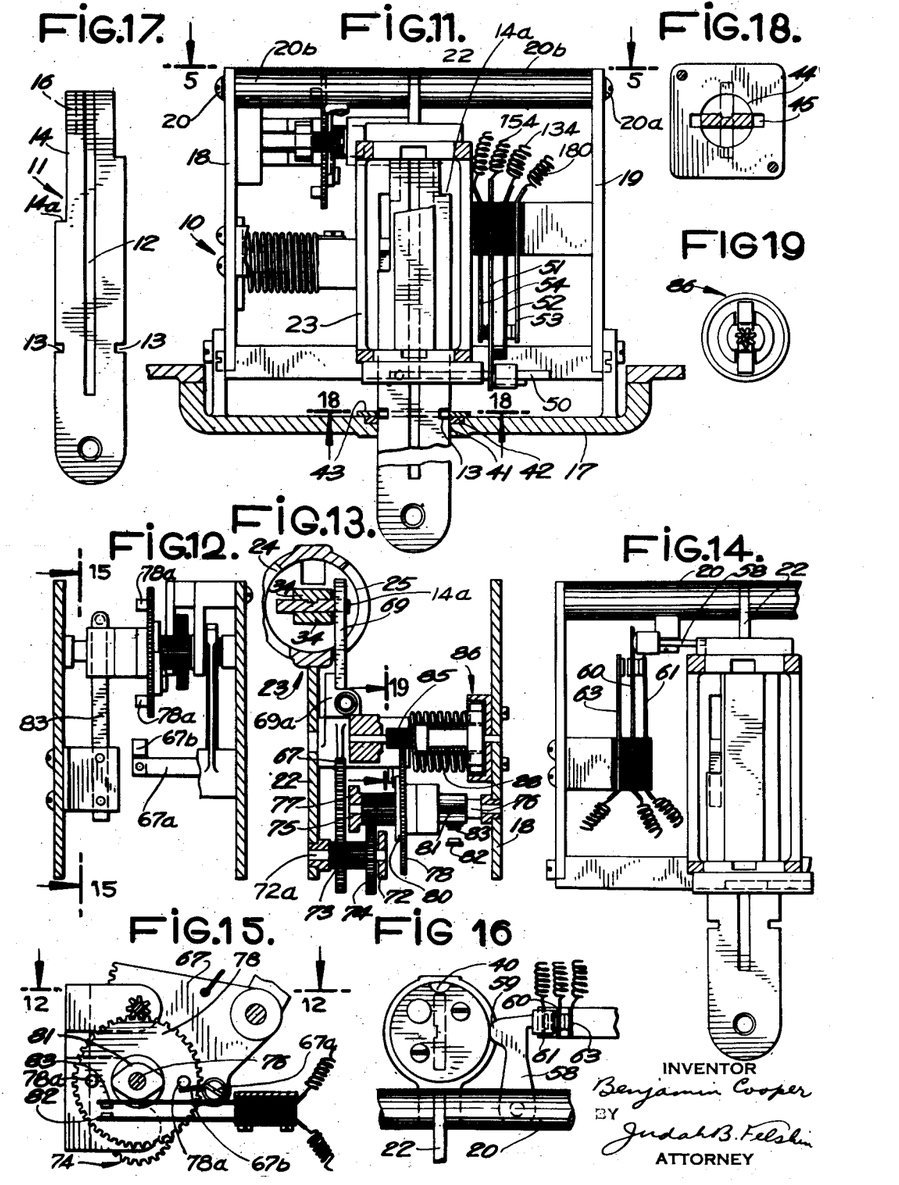
Fig. 11 is a cross-sectional view taken on line 11—11 of Fig. 7.
Fig. 12 is a cross-sectional view taken on line 12—12 of Fig. 15.
Fig. 13 is a cross-sectional view taken on line 13—13 of Fig. 6.
Fig. 14 is a top plan view taken on line 14—14 of Fig. 6.
Fig. 15 is a cross-sectional view taken on line 15—15 of Fig. 12.
Fig. 17 is a top plan view of the key used with my improved identifier.
Fig. 18 is a cross-sectional view taken on line 18—18 of Fig. 11.
Fig. 19 is a cross-sectional view taken on line 19—19 of Fig. 13.

Fastened to the wall 22 is a fixed cylindrical horizontal cage 23 (Figs. 11 and 13) extending from front to rear and being open at the ends thereof. The cage may be cut away longitudinally on opposite sides thereof as at 24 and 25 (Fig. 13). Rotatably mounted within the fixed cage 23 is a rotary cage 30, (Fig. 20) having front and rear aligned discs 31, 32 rotatably engaging the front and rear ends of the fixed cage. The discs 31 and 32 are interconnected by a pair of parallel, symmetrical bars 34 on opposite sides of the axis. The upper bar 34 may have a rib adapted to fit into groove 12 of key 11. The disc 31 has a cammed portion 35 on one side thereof formed with a radial shoulder 36. Said disc is furthermore formed with a through passage or opening 37 parallel to the radial edge 36. The disc 31 is formed with an opening 38 having the shape of the cross-section of the key 11, and provided with a central ridge 39 adapted to be received within the groove 12 of the key. The passage 37 communicates with the opening 38. The rear disc 32 is formed with a notch 40 for the purpose hereinafter appearing.

The front wall 17 is formed with a circular opening 41 having a diameter equal substantially to the width of the key. The rear surface of the wall 17 is provided with an annular recess rotatably receiving an annular washer 42, having an opening conforming in shape to the cross-section of the key. Fixed to the rear surface of the wall 17 is a plate 43 (Fig. 11) having an annular opening 44 of diameter equal to the distance between the aligned notches 13. On opposite diametrical sides of the opening 44 are horizontal extensions 45 (Fig. 18) of the said opening of sufficient width to permit the key to be inserted through the front wall 17 and preventing the turning of the key until the key is in such position that the notches 13 are aligned with the opening 44, in which position the key may be turned. Thus, the key cannot be turned until it is fully inserted.

The key also passes through the opening 38 in disc 31, which opening as aligned with the key opening in the rotary washer 42, and between the bars 34. When the key is fully inserted, the same may be turned to rotate the washer 42 and rotary cage 30.

Slidably mounted within the opening 37 in the disc 31 is a stem or pin 47 (Figs. 8 and 9) having a head 48 at the bottom end thereof. The width of the head 48 is less than the length of the radial shoulder 36, by a length substantially equal to the length of the part of the stem or pin which projects into the opening 38. When the key is inserted, the cammed portion 16 thereof engages the pin 47 and presses same downwardly to bring the head 48 flush with cam 35 of the disc 31 to permit turning of said disc in a clockwise direction. Pivoted to a fixed support within the casing in any suitable manner is a bell-crank lever 50 having one arm adapted to be engaged and depressed by the pin 47. Said lever has a second arm adapted to operate a switch having a pair of blades 51 and 52 (Fig. 11) interconnected by insulation so as to move together. When the key is not inserted, the blade 52 contacts a blade 53. Upon inserting the key and rotating the lever 50, the blades 51 and 52 are moved to the left, looking at Fig. 11, so that the blade 51 contacts a blade 54 and the blade 52 moves out of contact with respect to the blade 53. The fixed ends of the blades 51, 52, 53 and 54 are insulated from one another and from the frame.

Pivoted to the frame in any suitable manner is a lever 58 (Figs. 14 and 16) having a nose 59 adapted to be received within the notch 40 of disc 32, when the cage 30 is in normal angular position. The lever 58 is adapted to engage a blade 60 at one of its ends. The blade 60 is normally in contact with a blade 61 and out of contact with respect to a blade 63. When the rotary cage 30 is turned, however, the lever 58 is rotated in a clockwise direction, looking at Fig. 16, since the nose 59 moves out of the notch 40. The blade 60 then moves into contact with the blade 63 and out of contact with respect to the blade 61. The fixed ends of the blades 60, 61 and 63 are insulated from one another and from the frame.

The identifier has two pulsating units, one located on each side of the central wall 22. The units operate in the same manner and only one thereof has been shown and described, it being understood that the other pulsating unit is symmetrically disposed with respect to the first, and operates in the same manner.

The pulsating unit comprises a horizontal fixed shaft 66 in which is rotatably mounted a segmental gear 67. Pivoted to the segmental gear 67 on the axis or pin 71 perpendicular to the axis of the shaft 66 is a finger 69 extending through the opening 25 and substantially at right angles to and contacting the bars 34. A torsion spring 70 on the pivot pin 71 serves to maintain the finger 69 substantially in contact with a lug 69a on gear 67 for maintaining said finger upright. Journalled within suitable bearings on the wall 22 and on a bracket 72 fixed to the frame is the axle 72a of (Fig. 13) a pinion 73 meshing with the teeth of the gear 67. Fixed to the pinion 73 (Figs. 6 and 15) in co-axel therewith is a larger pinion 74. The pinion 74 meshes with a pinion 75 on a shaft 76 journalled on the side wall 18 and on a bracket 77 fixed to the frame and disposed parallel to said wall 18. Rotatably mounted on the shaft 76 is a gear 78 provided with an eccentric pawl 79 spring-pressed into engagement with the teeth of a ratchet wheel 80 fixed to the pinion 78. Rotation of the segment 67 in a counter clockwise direction, looking at Fig. 6 of the drawings, will not be accompanied by rotation of the gear 78. Rotation of the segment in the opposite direction by means hereinafter to be described will cause rotation of said gear 78 due to engagement of the ratchet wheel 80 with the pawl 79.

Fixed to the gear 78 and rotatable therewith is a cam or pulser 81 (Fig. 15) adapted to close and open a pair of switches 82 and 83 as said cam rotates. In the wiring diagram of Fig. 4, the blades or switch arms 82, 83 are indicated by the same numbers, and the number 81 designates the rotary member which opens and closes or makes and breaks said switches. The gear 78 meshes with a gear 85 suitably journalled on the frame and operating a friction governor 86 of any suitable construction for insuring constant speed of rotation. About the shaft 66 is disposed a torsion spring 88 which is adapted to be tensioned when the segmental gear 67 is rotated in a counter clockwise direction, whereby to store up energy for rotating said segmental gear in an opposite direction back to normal position.

The segmental gear 67 is rotated in the following manner: When the key is inserted into the unit, the finger 69 will not be engaged until the shoulder 14a at the end of the cut-out 14 engages the finger 69. As the key is further pushed into the machine, the finger 69 being connected to the segmental gear 67, will rotate the same about the shaft 66 and tension the torsion spring 88. During this movement, the gear 78 is not rotated. When the key is fully inserted, the same is turned in a clockwise direction, looking at Fig. 4 of the drawings, through an angle of 90 degrees to disengage the finger 69 and permit the torsion spring 68 to rotate the segmental gear in an opposite direction for rotating the gear 78 and the pulser 81. After the pulser has been operated, the key may be turned back 90 degrees to its original position and then withdrawn. When the key is turned back to its original position, the side edge thereof will engage the finger 69 and rotate the same about its axis 71 without affecting the rotation of the segmental gear 67.

It will now be understood that the length of cut-away on the key is inversely proportional to the amount of pulsation. If there is no cut-away on one edge, there will be nine pulsations on the corresponding pulser to bring the counter wheel controlled by said pulser to number nine which will be printed, as will appear hereinafter. If it is desired to print "0" the cut-away is maximum or sufficient not to actuate the pulser.

On the pinion 78 are two pins diametrically disposed, one with respect to the other. Fixed to the segment 67 is a pin 67a (Figs. 12 and 15) having a foot 67b located, when the segment is in normal position, in the path of said pins 78a. Thus, after the segment returns to normal position, rotation of pinion 78 is stopped by reason of engagement of one or the other of the pins 78a with the foot 67 b. The pinion 78 makes one half revolution for each pulsation or a complete revolution for two pulsations as will now be understood, and rotation of said pinion is stopped when the segment reaches normal position.

Fixed to the finger 69 below the fixed cage 23 is an insulated tip 90. When the key is inserted, the tip 90 is adapted to engage a blade 91 (Fig. 4) and hold the same in contact with a blade 92. When the key is inserted and the segment rotated about the shaft 66, the tip 90 will move away from the blade 91 and permit said blade to move into contact with a blade 93. The fixed ends of the blades 91, 92 and 93 are insulated from one another and from the frame.

It will be understood that on the opposite side of the central wall 22 are blades 91a, 92a and 93a similar and symmetrically disposed to the blades 91, 92 and 93 and adapted to be controlled by a second pulsing mechanism similar to the one described above. Thus, when a key is inserted into the identifying unit, if the key has cut-away portions on both edges thereof, the blades 91 and 91a will move out of contact from the blades 92 and 92a and into contact with the blades 93 and 93a. In Fig. 4, 81a, 82a and 83a indicate the second pulsing switch similar to the pulsing switches 81, 82 and 83.

Figure 1:
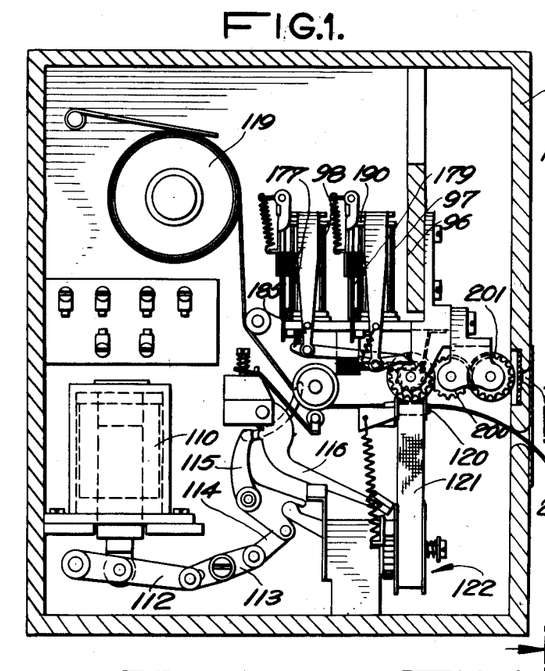
Fig. 1 is an elevational, cross-sectional view of the printing device actuated by an indentifier embodying the invention taken on line 1—1 of Fig. 2.
Figure 2:
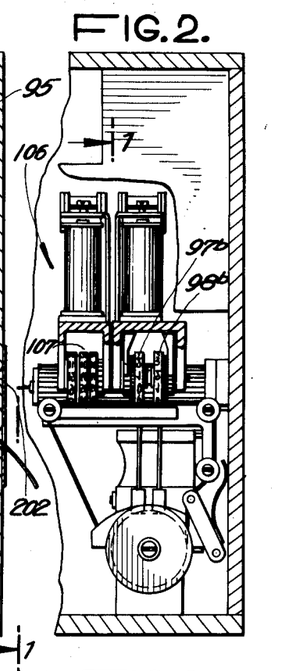
Fig. 2 is a partial, elevational, cross-sectional view of the device shown in Fig. 1.
Figures 3, 3A, 4:
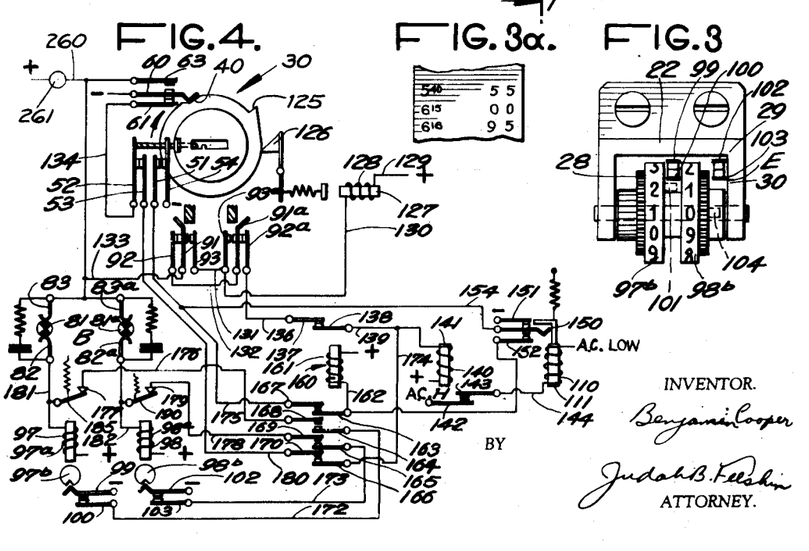
Fig. 3 is an elevational view of the counter wheels operated by the identifying unit.
Fig. 3a is a plan view of a fragment of the ribbon on which the identifier prints.
Fig. 4 is a wiring diagram illustrating the electrical system operated by the identifying unit.
Figures 5, 10, 20:
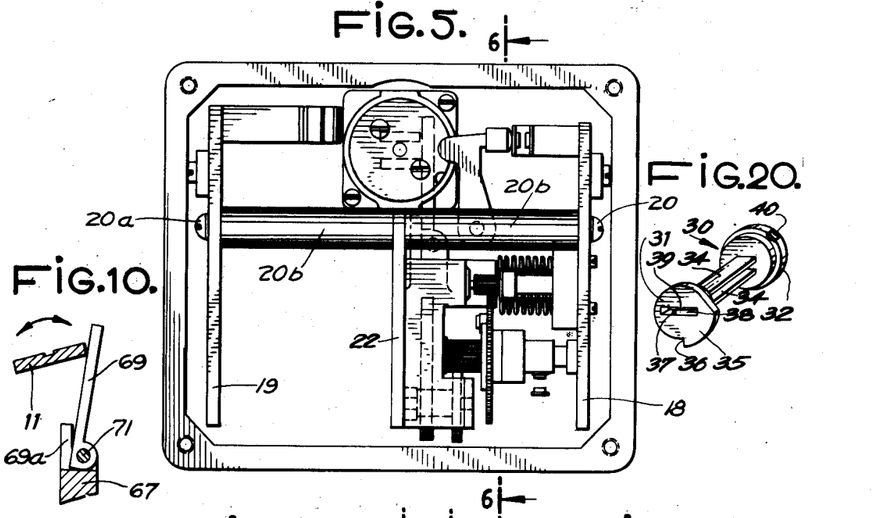
Fig. 5 is an elevational view of the rear side of the identifier taken on line 5—5 of Fig. 11.
Fig. 10 is an elevational, transverse, cross-sectional view of the key after the same has been inserted, turned and then turned back.
Fig. 20 is a perspective view of the rotary cage rotated with the identifying key.
Figure 6:
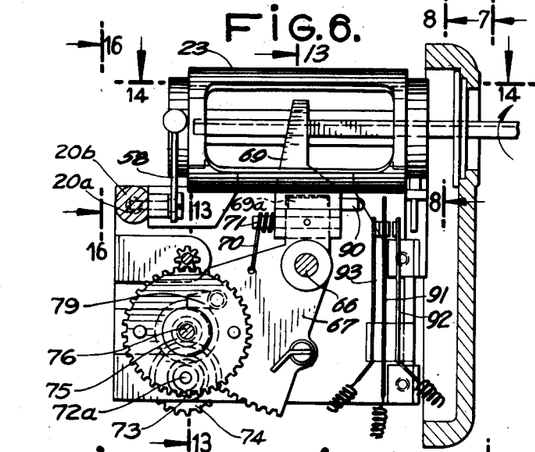
Fig. 6 is a cross-sectional view taken on line 6—6 of Fig. 5.
Figure 7:
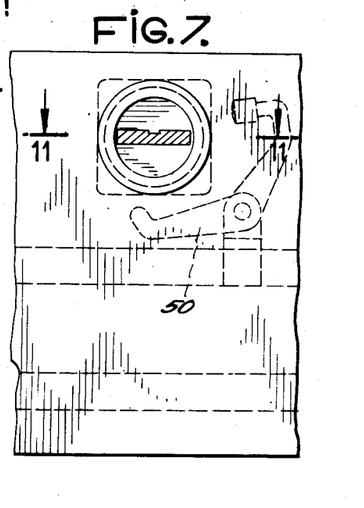
Fig. 7 is a cross-sectional view taken on line 7—7 of Fig. 6.
Figures 8, 9:
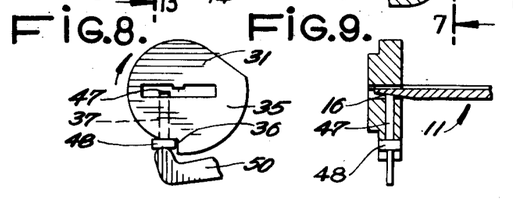
Fig. 8 is a cross-sectional view taken on line 8—8 of Fig. 6.
Fig. 9 is a cross-sectional view illustrating the point of entrance of the key into the identifying unit.

Referring now to Figs. 1, 2 and 3 of the drawings, 95 designates a box which may be remotely placed from the casing containing the pulsing unit. With said box is a wall 96 on which are mounted a pair of electro magnets 97 and 98 provided with coils 97a and 98a and having the usual actuating mechanism for operating a pair of counter wheels 97b and 98b. A pair of switch blades 99 and 100 are so fixed within the casing as to be normally in contact, but adapted to be separated by a pin 101 on the counter wheel 97b to separate said contacts when the "0" on the counter wheel is at the bottom or in printing position. Likewise, a pair of blades 102 and 103 are so fixed within the casing as to be normally closed, but adapted to be separated by pin 104 on the counter wheel 98b when the "0" on said counter wheel is at the bottom or in printing position. Within the casing or box 95 is also a time stamp mechanism 106 of any suitable construction with the counter wheels 107 thereof in alignment with the counter wheels 97b and 98b. The time stamp may be operated in any suitable manner so that whenever the printing operation is carried out for the identifying unit in the manner hereinafter described, the time will also be simultaneously printed next to the numbers printed by the counter wheels of the identifier.

The printing device may consist of mechanism shown and described in my Patent No. 2,115,410, issued April 26, 1938. Generally, the same comprises a solenoid 110 (Fig. 1) having a coil 111. The armature of said solenoid is connected to a lever 112 which in turn is connected to a lever 113, the latter being connected through a link 114 to a bellcrank 115. The bellcrank 115 is adapted to engage a hammer 116. Within the casing is a roll 119 of paper. The paper ribbon passes from the roll beneath rollers and over a platen 120. A carbon ribbon 121 passes over the paper ribbon and is fed intermittently by means of suitable mechanism 122 actuated through the bellcrank 115 and described in detail in my said co-pending application.

When the electro-magnet 110 is energized, the hammers are swung upwardly for pressing the carbon against the ribbon and against the counter wheel for causing the printing operation. Means is also provided as fully described in my said co-pending application for feeding the ribbon from the roller intermittently after each printing operation.

Referring now to the wiring diagram of Fig. 4, 125 designates a projection in the rear disc 32, and 126 designates a locking hook which is adapted to engage the projection for holding the rotary cage against return rotation when said cage has been rotated through an angle somewhat less than that which would be sufficient to release the finger 69 from the shoulder 14a. Numeral 127 designates an electro-magnet having a coil 128 and controlling the locking element 126. When the magnet 127 is energized, the element 126 is held in position to prevent rotation of the rotary cage 30 in a counter-clockwise direction or back to normal position. The cage may, however, continue to rotate in a clockwise direction. When the magnet is de-energized, the hooking element moves out of engagement with hook 125 to permit return rotation of said rotary cage. The coil 128 is connected by wire 129 to a plus terminal. Said coil is also connected by wire 130 to the blade 93a. The blade 93 is connected by wire 131 to the blade 93a. The blade 91a is connected by wire 132 to the blade 92. The blade 91 is connected by wire 133 to the blade 63. The blade 60 is connected to a minus terminal. The blade 61 is connected by wire 134 to the blade 52. The blade 92a is connected by wire 136 to a fixed switch arm 137. Cooperating with said switch is a movable switch arm 138 connected by wire 139 to the coil 140, of a printing relay 141. The coil 140 is connected to a plus terminal. Said relay is arranged to attract a movable switch arm 142 and move the same into contact with a fixed switch arm 143 connected by wire 144 to the coil 111 of the printing solenoid 110. The armature of the printing solenoid 110 when energized is adapted to move a blade 150, normally in contact with a blade 151, out of contact with respect thereto, and into contact with the blade 152. The blade 151 is connected to a minus terminal. The blade 150 is connected by wire 154 to the blade 51. The movable switch arm 138 is adapted to be attracted by a relay 160 having a coil 161 connected with the plus terminal. The other end of said coil is connected by wire 162 to the switch arm 152. Said relay 160 is also adapted to attract four movable switch arms designated by numerals 163, 164, 165 and 166, for moving the same into contact with fixed contacts designated 167, 168, 169 and 170, respectively. The contact 163 is connected to the wire 162. The contact 164 is connected by wire 172 to the blade 100. The contact 165 is connected by wire 173 to the blade 103. The contact 166 is connected by wire 174 to the wire 139. The movable contact 167 is connected by wire 175 to wire 154. The contact 168 is connected by wire 176 to a fixed contact 177. The switch arm or contact 169 is connected by wire 178 to a fixed contact 179. The switch arm 170 is connected by wire 180 to the blade 53. The switch 82 is connected to the coil 97a by wire 181. The switch 82a is connected to the coil 98a by wire 182.

The coils 97a and 98a are connected to plus terminals. A switch arm 185 connected to the wire 181 is normally held in engagement with the contact 177 by a spring or otherwise, but may be moved out of engagement with respect to said contact by a relay 97. A switch arm 190 connected to the wire 182 is normally held in engagement with the contact 179 by spring or otherwise, but may be moved out of engagement with said contact by the electro-magnet 98.

Switches 82 and 83 as well as 82a and 83a may be interconnected by absorption circuits for the purpose of spark suppression and including a condenser and resistor as shown in Fig. 4.

The diagram of Fig. 4 shows the position of the switches and other elements when the key is not inserted. In such position the relay 127 is de-energized. The counter wheels are in zero position and all of the relays and solenoids are de-energized. Upon inserting the key, the blade 52 moves out of contact with respect to the blade 53, and the blade 54 moves into contact with the blade 51. Upon pressing the key inwardly, assuming that the key is cut away on both sides, the blades 91 and 91a will move out of contact with respect to the blades 92 and 92a and into contact with the blades 93 and 93a. Upon rotating the key 90 degrees, the blade 60 moves out of contact with respect to the blade 61 and into contact with the blade 63. The solenoid 127 thus becomes energized, the circuit for the coil 128 being completed through wires 130, 131, blades 91 and 93, wire 133 and blades 63, 60. The hooking element 126 therefore is then held in hooking position to prevent rotation of the cage in the opposite direction, nor can the key be removed as long as the segmental gears have not returned to their zero positions. In other words, the key cannot be removed until the identifier is completely operated, as will appear hereinafter.

When the key is turned, the segmental gear operates the pulsers 81 and 81a for closing the switchese 82, 83, and 82a and 83a, a number of times, depending upon the length of the cut-away portions on the side edges of the key. The solenoids 97 and 98 become energized several times to operate the identifying counter wheels 97b and 98b. When the counter wheels rotate, the switch blades 99, 100, 102 and 103 are closed. When the segmental gears return to their original positions, the blades 91 and 91a move out of contact with respect to the blades 93 and 93a and again into contact with the blades 92, 92a. The printing relay 140 thus becomes energized through the wire 139, switch blades 137, 138, wire 136, blades 92a, 91a, wire 132, blades 92, 91, wire 133, and blades 63, 60. When the printing relay 140 becomes energized, the switch arm 142 moves into contact with the switch arm 143 for energizing the printing solenoid 110, thus opening the contacts 150, 151 and closing the contacts 150, 152. When the printing solenoid is energized, the printing operation takes place.

When the contact 150 engages the contact 152, the relay 160 is energized through wire 162, contacts 150, 152, wire 154 and blades 51, 54. When the relay 160 is energized, the switch arm 138 moves away from the switch arm 137, thereby interrupting the printing relay 140 and also the printing solenoid 110. When the relay 160 becomes energized, furthermore, the contacts 163, 164, 165 and 166 move into engagement with the contacts 167, 168, 169 and 170, respectively. The relay 160 is held in energized condition through the contacts 163, 167, wire 175 and blades 51, 54.

As soon as the relay 160 is energized, furthermore, the solenoids 97 and 98 are operated to return the counter wheels 97b and 98b to zero. The solenoid 97 is intermittently energized through the wire 181, switches 185, 177, wire 176, contacts 168, 163, wire 172 and switch 100, 99. The other solenoid 98 is intermittently energized through the wire 182, the vibrating switch 190, 179, wire 178, switch 169, 165, wire 173 and the switch blades 103, 102. As the solenoids 97 and 98 continue to be intermittently energized for operating the counter wheels 97b and 98b, the switches 99, 100 and 102, 103 will open when said counter wheels reach zero position.

Upon thereafter turning the key 90 degrees in the opposite direction to its original position, the contacts 60 and 61 are closed and the contacts 60, 63 are opened. As the key is pulled out, the contact 52 moves into engagement with the contact 53, and the contact 54 moves out of engagement with respect to the contact 51. The printing relay 140 is again energized through the contacts 60, 61, wire 134, contacts 52, 53, wire 180, contacts 170, 166 and wire 174. When the printing relay is again energized, the printing solenoid 110 is again energized for causing another printing operation. The identifier will print "0 0" and the time will also be printed alongside the "0 0". As the key is pulled out, the relay 160 is still held in energized condition through the contacts 163, 167, wire 175, wire 154 and the contacts 150, 151. However, when the printing solenoid operates a second time, the contacts 150, and 151 are separated, thus breaking the circuit 160. The entire system has now reached its original condition.

The counter wheels 97b and 98b (Figs. 3 and 4) may be interconnected by suitable gearing 200 to counter wheels 201 arranged opposite window opening 202 (Figs. 1 and 2). The counter wheels 201 are so arranged as to permit viewing of the same numbers as are at the bottom of the counter wheels 97b and 98b. In other words, the numbers which will be printed on the ribbon, may be seen through the window opening 202.

Figure 25:
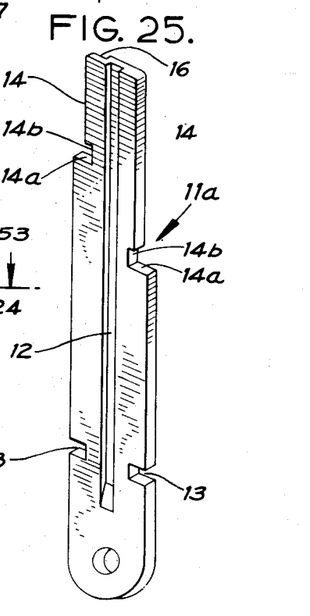
Fig. 25 is a perspective view of the key used with the identifier shown in Fig. 21.

In Fig. 25 there is shown another preferred form of the identifier key designated by numeral 11a; and in Figs. 21 to 24, 26 and 27 there is shown another preferred form of identifier unit designated by numeral 10a.

The key 11a is identical with key 11 except that the former has notches 14b at the inner ends of the cut-away portion 14, adjacent the shoulders 14a, for the purpose hereinafter appearing.

The unit 10a (Fig. 21) has a front wall 17a formed with a circular opening 41a, a rotary disc 42a having a key shaped opening being held in a recess in said wall by a fixed plate 43a having an opening 44a, 45a similar to opening 44, 45 in plate 43. Fixed to the front wall is a frame supporting a fixed cage 23a within which is journalled a rotary cage 30a substantially similar to cage 30 and having front and rear aligned discs interconnected by parallel longitudinal bars 34a.

The front disc of the rotary cage designated by numeral 31a has a key shaped opening 38a aligned with a key-shaped opening in the disc 42a. Said disc 31a is further formed with a vertical through passage 37a communicating with the passage 38a with an enlarged notch 37b in the periphery thereof at the outer end of said passage. Said disc is furthermore provided with a pin 40a adjacent the periphery thereof. Pivoted to the frame in any suitable manner, is a lever 58 having an arm 59, the outer end whereof contacts the pin 40a. Fixed to the frame are a pair of switch blades 60 and 61 normally held in contact at their outer ends by said lever. Another switch blade 63 is fixed to the frame adjacent the blade 60, but out of contact with the latter when lever 58 engages blade 60. However, when the rotary cage is rotated, the lever 58 moves off the pin and is turned in a clockwise direction, looking at Fig. 21 for moving the blade 60 out of contact with the blade 61 and into contact with the blade 63.

There is also pivoted to the frame in any suitable manner, a lever 50 having a portion disposed adjacent the notch 37b. Within the passage 37a is a pin 47 having a head 48 within the notch 37b. The lever 50 engages said head 48. Attached to the frame are a pair of switch blades 52, 54, interconnected by an insulated member to move together. There is also attached to the frame a pair of blades 51 and 53. The blade 53 is normally in contact with the blade 52 and the blade 51 is normally out of contact with the blade 54. However, when a key is inserted into the rotary cage, the ramped portion 16 thereof will press the pin 47 downwardly to cause rotation of the lever 50 in a counter-clockwise direction, looking at Fig. 21 of the drawings, for moving the blade 54 in contact with the blade 51 and the blade 52 out of contact with the blade 53. As the cage is rotated by turning of the key, the lever 50 remains in contact with the periphery of the disc 31a and is not rotated, so that the switch blades 51 and 54 remain in contact, and the switch blades 52 and 53 remain out of contact until the key has been turned back to its original position and withdrawn from the identifier.

The identifier 10a has two similar pulsers disposed on opposite sides of the cage 23a. These pulsers operate in exactly the same manner and each one is actuated by one of the side edges of the key 11a. Said identifying units are exactly the same and one is positioned at 180° to the other and on the other side of a vertical plane through the axis of the cage 23a. Only one of said units will be described.

Each pulser comprises a U-shaped guide 220 (Fig. 21), fixed to the frame on one side thereof, having parallel horizontal slots 221 (Fig. 23) in the upstanding side walls thereof. Slidably mounted on said guide is a rack 222 having projecting rollers or pins 224 within the slots 221. Pivoted to said rack is a finger 225 projecting into the rotary cage and having an upstanding portion contacting the side edges of the bars 34a. A strip spring 226 fixed to the rack serves to press the finger 225 against said bars. For the purpose hereinafter appearing, the upper of said bars 34a has adjacent the disc 31a on opposite sides thereof, a widened portion 34b, the widened edges connecting with the narrower edges by inclined portions 34c. When the key is not inserted into the identifier, the finger 225 engages the adjacent widened edge 34b. The width of the finger 225 is substantially equal to the width of a notch 14a in the key 11a for the purpose hereinafter appearing.

When the key is inserted into the identifier, the shoulders 14a thereof will engage the finger 225 to push the racks forwardly. (In the drawings, only one of said racks is shown.) When the finger 225 moves beyond the widened portions 34b, said finger will enter the notch 14b in the key. When the key reaches the end of this inward movement, the rack cannot continue moving forwardly by inertia because the finger 225 is within the notch. Upon removing the key from the identifier, the finger 225 will remain in the notch 14b until said finger reaches the cammed or inclined portion 43c. Further withdrawal of the key will cause the finger to be moved out of the notch 14b to permit withdrawal of the key from the identifier.

Fixed to the frame is an annular cup-shaped member 230. Journalled in said member is a shaft 231 disposed at right angles to and above the rack 222. Fixed to said shaft is a sleeve 232 carrying a pinion 233 meshing with the rack 222. On said sleeve is an arm 234 carrying a pivoted pawl 235 urged to rotate in a counterclockwise direction, looking at Fig. 27 of the drawings, by a spring 236. Rotatably mounted on said shaft 231 is a ratchet 238 adapted to cooperate with the pawl 235. There is also rotatably mounted on said shaft and arranged for rotation together with the ratchet 238 a gear 240 for the purpose hereinafter appearing. The shaft 231 extends beyond the cup-shaped member 230 and on said extending portion is a torsion spring 241 having one end attached to the shaft and the other end to the member 230.

Figures 21, 22, 26, 27:
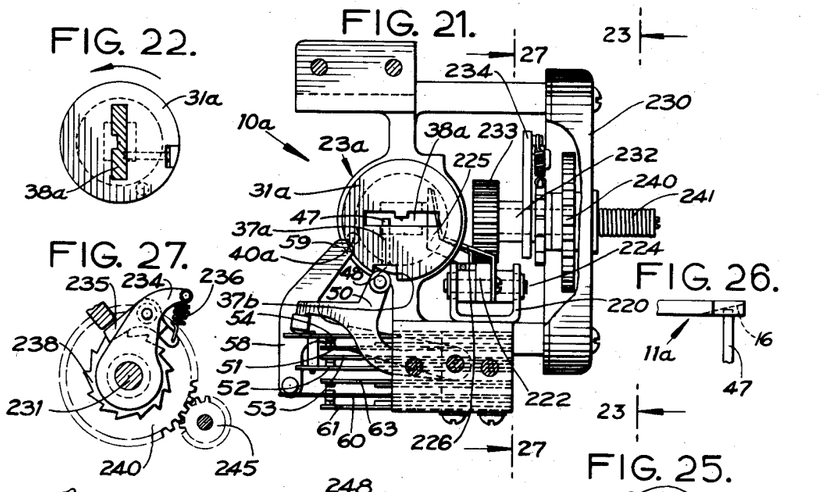
Fig. 21 is a front elevational view of the identifying unit embodying the invention and illustrating another form thereof.
Fig. 22 is an elevational view taken in front of the cage with the key turned 90 degrees.
Fig. 26 is a partial, elevational view of one end of the key and pin actuated thereby.
Fig. 27 is a cross-sectional view taken on line 27—27 of Fig. 21.
Figure 23:
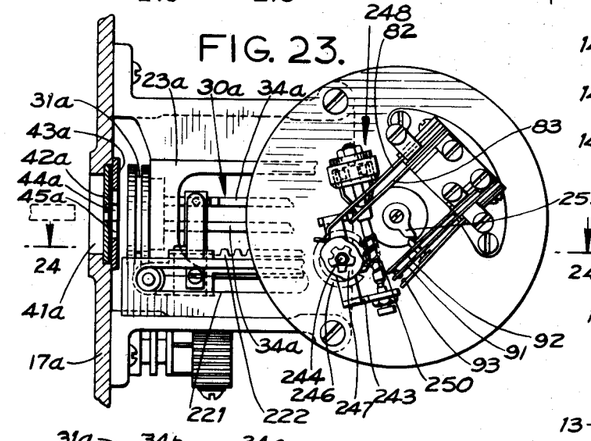
Fig. 23 is a side elevational, cross-sectional view taken on line 23—23 of Fig. 21.
Figure 24:
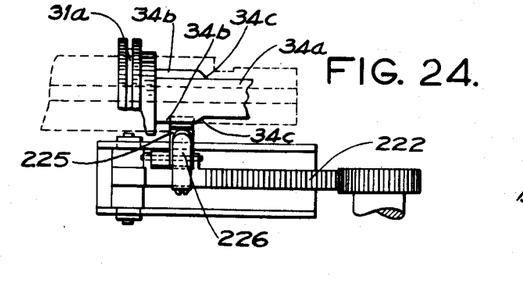
Fig. 24 is a cross-sectional view taken on line 24—24 of Fig. 23.

In Fig. 23 are shown the following elements omitted from Fig. 21. Fixed on the outside of the cup-shaped member 230 is a frame 243 carrying a shaft 244 having thereon a gear 245 meshing with the pinion 240. On said shaft is also a worm wheel 246 and a pulsing cam 247. A governor 248 on frame 243 has a worm 250 meshing with the worm wheel 246. Fixed to said cup-shaped member is also a switch blade 82 adapted to be moved by the cam 247. Another switch blade 83 on said cup-shaped member 230 normally contacts the blade 82. The latter blade is moved out of engagement with respect to the blade 83 twice during each revolution of the cam 247. There is further fixed to the cup-shaped member 230, a blade 92 attached to a blade 93 and insulated therefrom. Between said blades is a blade 91 normally in contact with the blade 93 and out of contact with the blade 92. Fixed to the shaft 231 is a radial pin 253 adapted to move the blades 92, 93 together for moving the blade 93 out of contact with the blade 91 and the blade 92 into contact with said blade 91. When the key is not in the identifier, the pin 253 is normally in engagement with the attached together blades 92, 93 for holding the blade 92 in engagement with the blade 93 and the blade 93 out of engagement with the blade 91. When the key is inserted into the identifier and the shaft rotates, the pin 253 will release the blades 92, 93 to permit the former to move out of engagement with the blade 91 and the latter into engagement with said blade. When the pulsing ceases, the pin 253 will be back to the position shown in Fig. 23 of the drawings. The blades 51, 52, 53, 54, 60, 61, 63, 82, 83, and 91, 92 and 93 correspond to the switch blades having similar numerals as indicated in Fig. 4 of the drawings, and are similarly connected to the remaining apparatus.

When the key in inserted into the identifier, the rack 222 rotates the pinion 233, the shaft 231 and the arm 234. The pawl 235 moving in a clock-wise direction looking at Fig. 27 of the drawings, will not rotate the ratchet 238. During such movement, the torsion spring 241, which acts as a power device, will be tensioned. After the key has been fully inserted, and turned through an angle of 90 degrees, the finger 225 will be released and the torsion spring 241 will rotate the shaft and hence the pinion in an opposite direction, bringing the rack back to its original position and rotating the ratchet 238 and pinion 240, in turn rotating the pulsing cam 247 to actuate the pulsing switch 82, 83.

The wiring diagram of Fig. 4 applies to the identifier shown in Figs. 21 to 27, the same as to the identifier of Figs. 5 to 20, the operation being exactly the same, the identifier 10a cooperating with the printing counters, 97b, 98b.

Means is provided to indicate by a light or an electric signal whenever the key is inserted into the identifier, and has been turned. To this end, as shown in Fig. 4 of the drawings, a wire 260 connects the blade 63 with a plus terminal, an electric light or other electric signal 261 being interposed in said wire. It will now be understood that whenever the key is inserted and turned, the blade 60 will engage the blade 63 for completing the circuit for the electric light or signal 261.

Although the invention has been illustrated and described in connection with an electromagnetic counter having numbered wheels, it will be understood that lettered wheels may also be used. In fact, any figured wheel or other printing means operating electrically may be substituted for the counter.

It will thus be seen that there is provided a device in which the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In an identifier comprising a member adapted to receive a key, a key longitudinally insertible therein, said key having a shoulder on one edge, a rack mounted for sliding movement longitudinally of said member, means on said rack adapted to be engaged by said shoulder, whereby to slidably move said rack upon moving said key into said member, a pulser controlled by said rack, and means on said key to prevent said rack from continuing to slide after the key has been fully inserted into said member.

2. In an identifier comprising a rotary cage adapted to receive a key, a key longitudinally insertible therein, said cage being rotatable upon turning said key after said key has been inserted into said cage, said key having a shoulder on one edge, a rack mounted for sliding movement longitudinally of said cage, means on said rack adapted to be engaged by said shoulder, whereby to slidably move said rack upon moving said key into said cage, a pulser controlled by said rack, and a member adapted to be tensioned upon inserting said key into said cage, said means being disengageable from said key upon turning said key to rotate said cage, after inserting the key into the cage, said tensioned member being adapted to move said rack back to normal position when said means becomes disengaged.

3. In an identifier, a member adapted to receive a key, a key insertible therein, said key having a shoulder on one edge, a slidably mounted rack, means on said rack adapted to be engaged by said shoulder whereby to slidably move said rack upon inserting said key into said member, and means on said key to prevent said rack from continuing to slide after the key has been fully inserted into said member.

4. In an identifier, a rotary edge adapted to receive a key, a key longitudinally insertible therein, said key having a shoulder, a rack mounted for sliding movement longitudinally of said cage, means on said rack adapted to be engaged by said shoulder, whereby to slidably move said rack away from normal position longitudinally of said cage, upon inserting said key into said cage, and means adapted to be tensioned upon inserting said key into said cage, said first means being disengageable from said shoulder upon turning said key and cage after inserting the key into the cage, said tensioned means being adapted to move said rack back to normal position when said first means becomes disengaged from said member.

5. In an identifier, a rotary member adapted to receive a key, a key longitudinally insertible into said member, a second member mounted for movement relative to said first member, means on said key to engage said second member for moving the same away from normal position upon inserting said key into said first member, means adapted to be tensioned by said second member when said second member is moved by said key, and to move said second member back to normal position upon releasing said second member from engagement with said means on said key, said means on said key being disengageable from said second member upon rotating said key and rotary member, to permit said tension means to return said second member to normal position, and a pulser adapted to be actuated by said second member upon return thereof to normal position, and means to prevent rotation of said key back to normal position until said second member has been returned to normal position.

6. In an identifier, a rotary member adapted to receive a key, a key longitudinally insertible into said member, a second member mounted for movement relative to said first member, means on said key to engage said second member for moving the same away from normal position upon inserting said key into said first member, means adapted to be tensioned by said second member when said second member is moved by said key, and to move said second member back to normal position upon releasing said second member from engagement with said means on said key, said means on said key being disengageable from said second member upon rotating said key and rotary member, to permit said tension means to return said second member to normal position, a pulser controlled by said second member, means to prevent rotation of said key until the same has been inserted into said rotary member to a predetermined position, and means to prevent said second member from continuing to move away from normal position after said key has been inserted to a predetermined position in said rotary member.

7. In an identifier, a rotary member adapted to receive a key, a key longitudinally insertible into said member, a second member mounted for movement relative to said first member, means on said key to engage said second member for moving the same away from normal position upon inserting said key into said first member, means adapted to be tensioned by said second member when said second member is moved by said key, and to move said second member back to normal position upon releasing said second member from engagement with said means on said key, said means on said key being disengageable from said second member upon rotating said key and rotary member, to permit said tension means to return said second member to normal position, and means to prevent rotation of said rotary member back to normal position after said second member has been released, until the latter has moved back to normal position.

8. In a key operated identifier, a member adapted to receive a key, a pulser, means cooperating with a key within said member and depending upon the shape of the key to actuate said pulser and control the number of pulsations on said pulser, an electro-magnetic unit controlled by said pulser adapted to rotate a figured wheel through an angle depending upon the number of pulsations, means for automatically printing by means of said wheel when said wheel is rotated through said angle, means for automatically returning the wheel to normal position after printing thereon, and means for printing by means of said wheel in normal position upon withdrawing the key from said member after said wheel is returned to normal position.

9. An identifier comprising means to receive a key, a pulser, means controlled by a key within the key receiving means, including an element variably positioned in accordance with the shape of the key to produce a number of pulses on said pulser depending upon the position of said variably positioned element, an electro-magnetic counter responsive to the pulses from the pulser, means to automatically print an identification of the key by means of said electro-magnetic counter after said counter has been actuated by the pulser, and means to cause a second actuation of the printing means automatically upon withdrawal of the key from the key receiving means.

10. An identifier comprising means to receive a key, a pulser, means controlled by a key within the key receiving means, including an element variably positioned in accordance with the shape of the key to produce a number of pulses on said pulser depending upon the position of said variably positioned element, an electro-magnetic counter responsive to the pulses from the pulser, means to automatically print an identification of the key by means of said electro-magnetic counter after said counter has been actuated by the pulser, means for locking the key in the key receiving means against removal upon initiating the pulsing operation, means for releasing the locking means automatically upon completing the printing operation to permit the removal of the key from the key receiving means, and means to cause a second actuation of the printing means automatically upon withdrawal of the key from the key receiving means.

11. An identifier comprising means to receive a key, an identifying element, means controlled by a key within said key receiving means, and depending upon the shape of the key for actuating said identifying element, means for automatically printing an identification by means of said element after said element has been actuated, means for locking the key in the key receiving means against removal upon actuation of said identifying element, means to release the locking means automatically after the printing operation is completed to permit removal of the key from the key receiving means, and means to print a second time by means of said element upon withdrawal of said key from said key receiving means.

12. In an identifier adapted to be operated by a key, a member adapted to receive the key, a second member mounted for movement relative to said first member, said second member being moved by engagement with the key upon inserting said key into said first member, a pulser, means controlled by said second member for actuating said pulser, and means having a portion adapted to be engaged by the key and locked for transitory movement therewith to prevent said second member from continuing to move after said key has been inserted into said first member to a predetermined distance.

13. An identifier comprising means to receive a key, an identifying element, means controlled by a key within said key receiving means, including an element variably positioned in accordance with the shape of the key, for actuating said identifying element to identify said key, means for automatically printing an identification of said key by means of said identifying element after said element has been actuated to identify said key, and mechanism controlled by withdrawal of the key from the key receiving means for printing a second time by means of said identifying element.

14. An identifier comprising means to receive a key, an identifying element, means controlled by a key within said key receiving means, including an element variably positioned in accordance with the shape of said key, for actuating said identifying element to identify said key, means for automatically printing an identification by means of said identifying element after said identifying element has been actuated to identify the key, means for automatically returning said identifying element to normal position after said printing operation has been made and while the key is still in the key receiving means, and mechanism controlled by withdrawal of the key from the key receiving means for printing a second time by means of said identifying element while the latter is in normal position.

15. In an identifier, means for receiving a key, means controlled by a key within said key receiving means and including an element variably positioned in accordance with the shape of the key to print an identification of the key, and means controlled by withdrawal of the key from said identifier for automatically causing a second printing operation of said printing means.

BENJAMIN COOPER.